United States Patent
Agrawal et al.

(10) Patent No.: US 10,332,310 B2
(45) Date of Patent: Jun. 25, 2019

(54) DISTRIBUTED INDEX FETCH, PRIMITIVE ASSEMBLY, AND PRIMITIVE BATCHING

(71) Applicant: NVIDIA Corporation, Santa Clara, CA (US)

(72) Inventors: Niket Agrawal, Bangalore (IN); Amit Jain, Bangalore (IN); Dale Kirkland, Madison, AL (US); Karim Abdalla, Menlo Park, CA (US); Ziyad Hakura, San Jose, CA (US); Haren Kethareswaran, Bangalore (IN)

(73) Assignee: NVIDIA CORPORATION, Santa Clara, CA (US)

( * ) Notice: Subject to any disclaimer, the term of this patent is extended or adjusted under 35 U.S.C. 154(b) by 77 days.

(21) Appl. No.: 14/979,342

(22) Filed: Dec. 22, 2015

(65) Prior Publication Data
US 2017/0178401 A1 Jun. 22, 2017

(51) Int. Cl.
*G06T 17/10* (2006.01)
*G06T 17/20* (2006.01)

(52) U.S. Cl.
CPC .............. *G06T 17/10* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 7,071,935 B1 * | 7/2006 | Deering | G06T 9/00 345/419 |
| 7,324,105 B1 * | 1/2008 | Moreton | G06T 17/20 345/420 |
| 8,558,842 B1 * | 10/2013 | Johnson | G06T 15/005 345/502 |
| 2009/0309876 A1 * | 12/2009 | Dorbie | G06T 17/20 345/423 |
| 2011/0141122 A1 * | 6/2011 | Hakura | G06T 1/00 345/505 |
| 2013/0265309 A1 * | 10/2013 | Goel | G06T 15/80 345/426 |

* cited by examiner

*Primary Examiner* — Yi Wang
(74) *Attorney, Agent, or Firm* — Artegis Law Group, LLP

(57) ABSTRACT

One embodiment of the present invention includes a technique for distributing work slices associated with a graphics processing unit for processing. A primitive distribution system receives a draw command related to a graphics object associated with a plurality of indices. The primitive distribution system creates a plurality of work slices, where each work slice is associated with a different subset of the indices included in the plurality of indices. The primitive distribution system scans a first subset of indices to identify a first set of characteristics that is needed to process a second subset of indices. The primitive distribution system processes the second subset of indices based at least in part on the one or more characteristics. Advantageously, because multiple work slices are analyzed in parallel for duplicate indices, the time required to analyze work slices is more in balance with the time required to process the work slices, leading to greater utilization of GPU resources and improved overall performance.

20 Claims, 9 Drawing Sheets

Figure 8

DISTRIBUTED INDEX FETCH, PRIMITIVE ASSEMBLY, AND PRIMITIVE BATCHING

BACKGROUND OF THE INVENTION

Field of the Invention

Embodiments of the present invention relate generally to computer graphics processing and, more specifically, to distributed index fetch, primitive assembly, and primitive batching.

Description of the Related Art

In computer graphics, software applications render two-dimensional (2D) and three-dimensional computer graphics (3D) objects for display by transmitting a draw command, also referred to as a draw call, via an application programming interface (API). Typically, when rendering a graphics object, a graphics driver receives the draw command from a particular software application via the API and transfers the draw command to a graphics processing unit (GPU) for rendering. The draw command includes an address that points to a location within an index buffer. The index buffer includes a list of pointers to vertices for the graphics primitives that make up the graphics object. The graphics primitives are typically points, line segments, triangles, quadrilaterals, or surface patches. Upon receiving the draw command from the graphics driver, the GPU draws the graphics object by rendering the graphics primitives associated with the vertices. Typically, the rendered graphics primitives are displayed on a display device.

Complex graphics objects can include thousands or millions of indices. In order to more efficiently render such complex objects, the GPU usually divides the indices into units of work, referred to as batches, and distributes the batches to individual graphics processing pipelines implemented within the GPU. Prior to distributing the batches, a primitive distributor within the GPU performs an index scan that analyzes each index in order to eliminate duplicate indices. Duplicate indices typically occur when graphics primitives are adjacent to one another. For example, a line segment could share a vertex with an adjacent line segment, while a triangle or quadrilateral could share two vertices with an adjacent triangle or quadrilateral, respectively. After eliminating duplicate vertices, the primitive distributor divides the remaining vertices into more or less equal-sized batches and distributes the batches to the individual graphics processing pipelines for further processing.

One drawback to the above approach is that the analysis needed to eliminate duplicate indices is computationally intensive. For example, if the primitive distributor were to analyze M indices simultaneously, and the primitive distributor were to compare each index with the preceding N index to search for duplicates, then the index analysis process would be M×N in computational intensity. As a result, the graphics processing pipelines implemented within a GPU can typically process batches at a faster rate than the primitive distributor can analyze indices and create new batches, creating a performance bottleneck.

Another drawback to the above approach is that the primitive distributor generally accesses M indices during every clock cycle, resulting in significant bandwidth impact on the memory system. For example, if the primitive distributor were to generate 4 primitives every clock and each primitive needs 3 indices, then the primitive distributor would access 4×3=12 indices per clock cycle. In order to increase the throughput of the primitive distributor, either or both of the number of indices analyzed simultaneously or the number of previous indices compared to each vertex. But increasing the number of indices analyzed simultaneously or the number of previous indices compared to each vertex increases the design complexity of the primitive distributor and further increases the demand on memory bandwidth, leading to further reductions in performance.

As the foregoing illustrates, what is needed in the art is more effective approach for distributing work in a GPU.

SUMMARY OF THE INVENTION

One embodiment of the present invention sets forth a method for distributing work slices associated with a graphics processing unit for processing. The method includes receiving a draw command related to a graphics object that is associated with a plurality of indices. The method further includes creating a plurality of work slices, where each work slice is associated with a different subset of the indices included in the plurality of indices. The method further includes scanning a first subset of indices to identify a first set of characteristics that is needed to process a second subset of indices. The method further includes processing the second subset of indices based at least in part on the one or more characteristics.

Other embodiments of the present invention include, without limitation, a computer-readable medium including instructions for performing one or more aspects of the disclosed techniques, as well as a primitive distribution system and a graphics processing unit for performing one or more aspects of the disclosed techniques.

At least one advantage of the disclosed technique is that, because multiple work slices are analyzed in parallel for duplicate indices, the time required to analyze work slices is more in balance with the time required to process the work slices, leading to greater utilization of GPU resources and improved overall performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 illustrates a timeline of work slice processing across three of the GPCs of FIG. 4, according to various embodiments of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
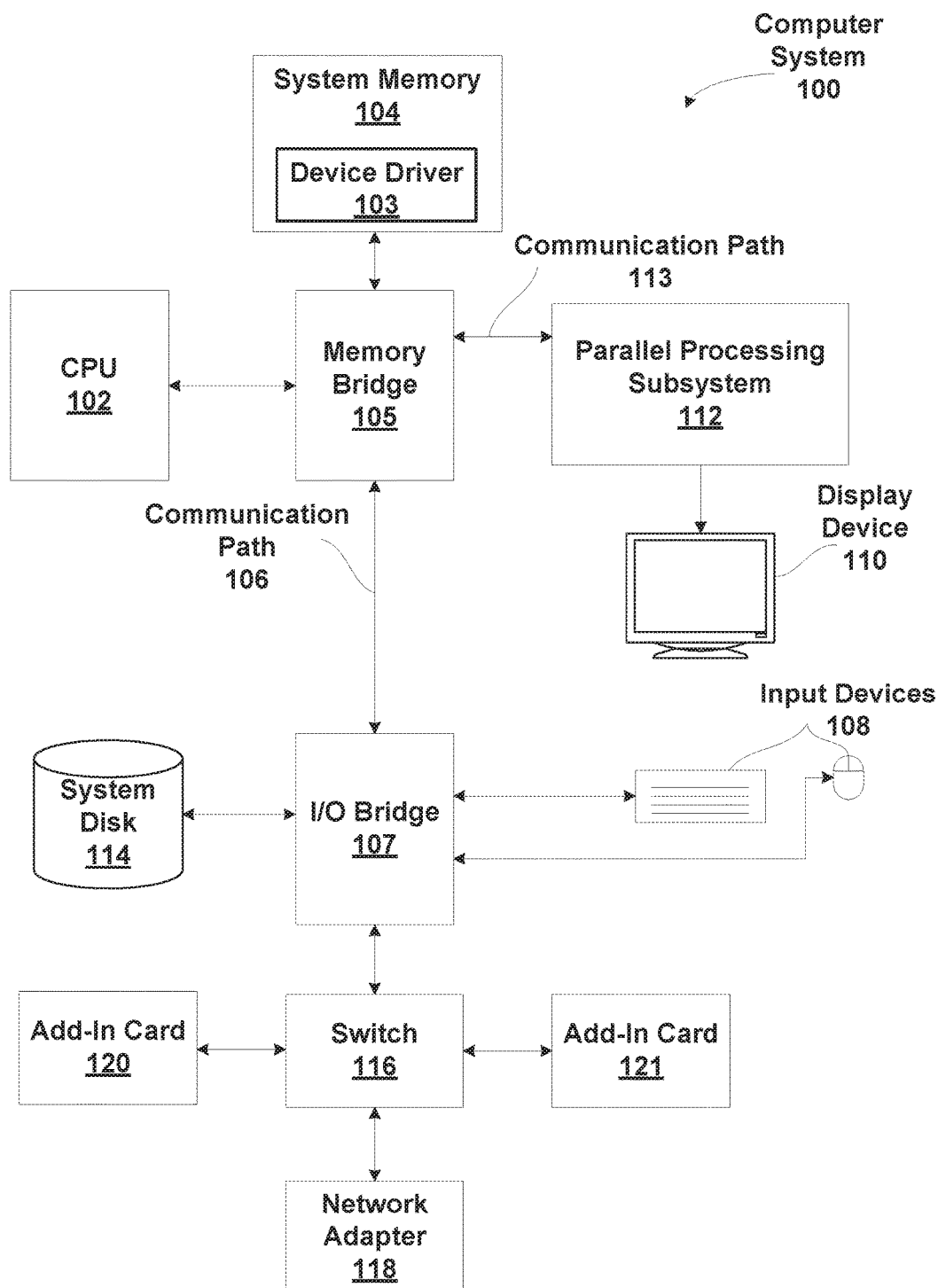
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 is part of a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
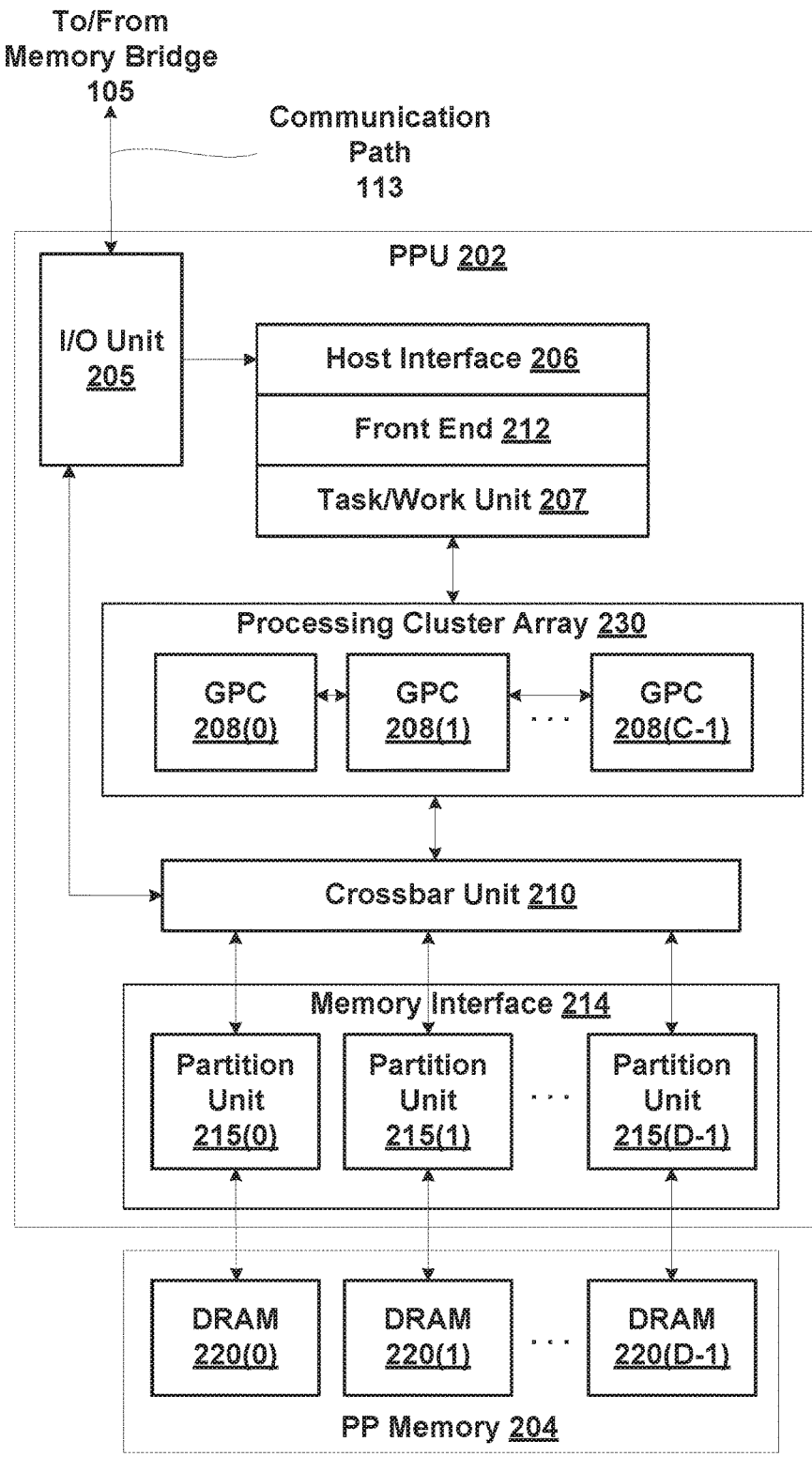
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

It will be appreciated that the core architecture described herein is illustrative and that variations and modifications are possible. Among other things, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-2 in no way limits the scope of the present invention.

Graphics Pipeline Architecture

Figure 3:
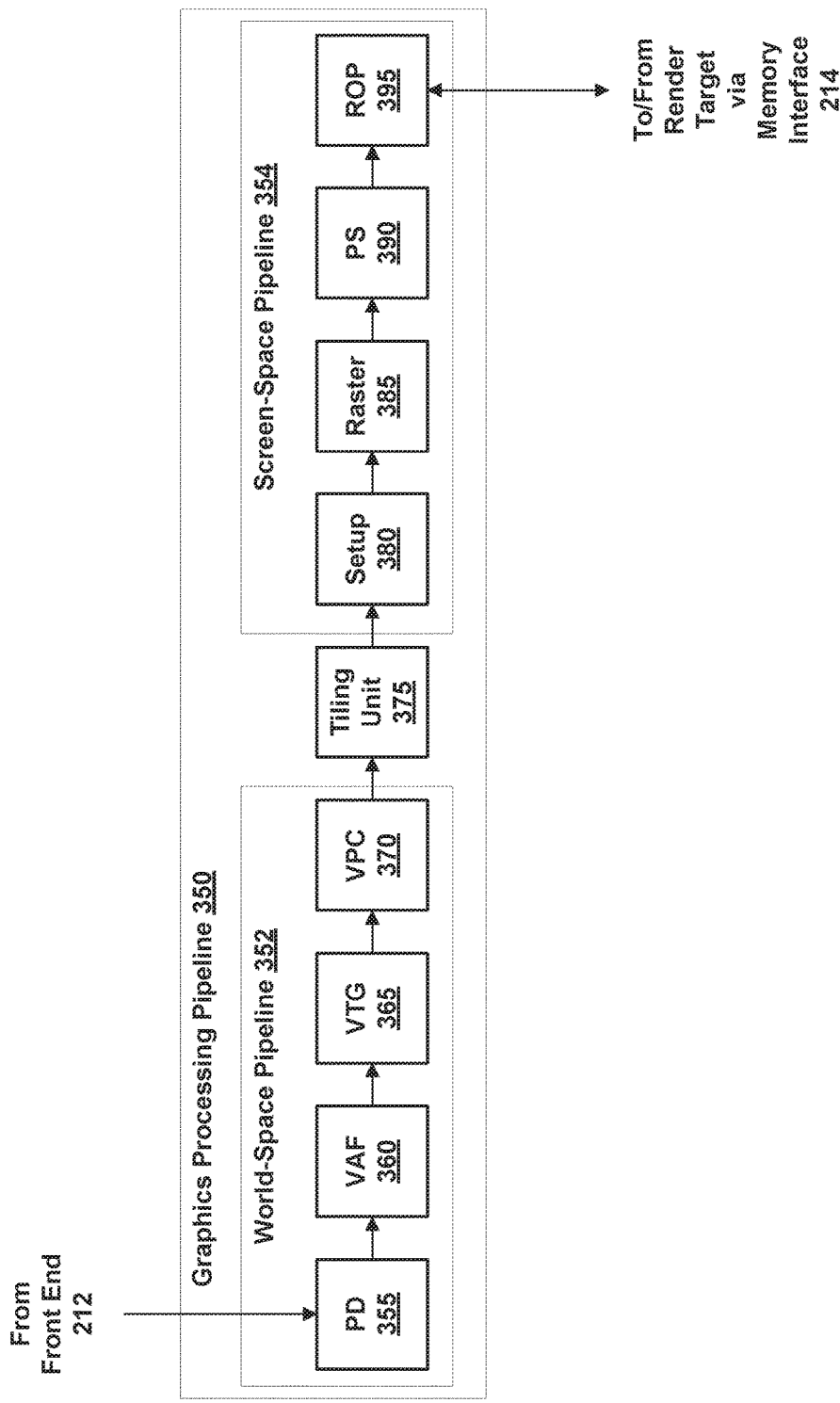
FIG. 3 is a conceptual diagram of a graphics processing pipeline that may be implemented within the parallel processing unit of FIG. 2, according to various embodiments of the present invention.

FIG. 3 is a conceptual diagram of a graphics processing pipeline 350 that may be implemented within PPU 202 of FIG. 2, according to various embodiments of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world-space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world-space pipeline 352 and a screen-space pipeline 354, as further described herein. Graphics primitives are processed in the world-space pipeline 352 and then transmitted to the tiling unit 375. The screen-space is divided into cache tiles, where each cache tile is associated with a portion of the screen-space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world-space pipeline 352, but are then transmitted multiple times to the screen-space pipeline 354.

Such a technique improves cache memory locality during processing in the screen-space pipeline 354, where multiple memory operations associated with a first cache tile access a region of the L2 caches, or any other technically feasible cache memory, that may stay resident during screen-space processing of the first cache tile. Once the graphics primitives associated with the first cache tile are processed by the screen-space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen-space processing of the second cache tile. Accordingly, the overall memory traffic to the L2 caches and to the render targets may be reduced. In some embodiments, the world-space computation is performed once for a given graphics primitive irrespective of the number of cache tiles in screen-space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, the functions one or more of the PD 355, the VTG 365, the VAF 360, the VPC 450, the tiling unit 375, the setup unit 380, the rasterizer 385, the pixel shading unit 390, and the ROP 395 may be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world-space pipeline 352 and a screen-space pipeline 354. The world-space pipeline 352 processes geometry objects in 3D space, where the position of each geometry object is known relative to other geometry objects and relative to a 3D coordinate system. The screen-space pipeline 354 processes geometry objects that have been projected from the 3D coordinate system onto a 2D planar surface representing the surface of the display device 110. For example, the world-space pipeline 352 could include pipeline stages in the graphics processing pipeline 350 from the PD 355 through the VPC 370. The screen-space pipeline 354 could include pipeline stages in the graphics processing pipeline 350 from the setup unit 380 through the ROP 395. The tiling unit 375 would follow the last stage of the world-space pipeline 352, namely, the VPC 370. The tiling unit 375 would precede the first stage of the screen-space pipeline 354, namely, the setup unit 380.

In some embodiments, the world-space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of geometry objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more GPCs 208, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Distributed Index Fetch, Primitive Assembly, and Primitive Batching

Figure 4:
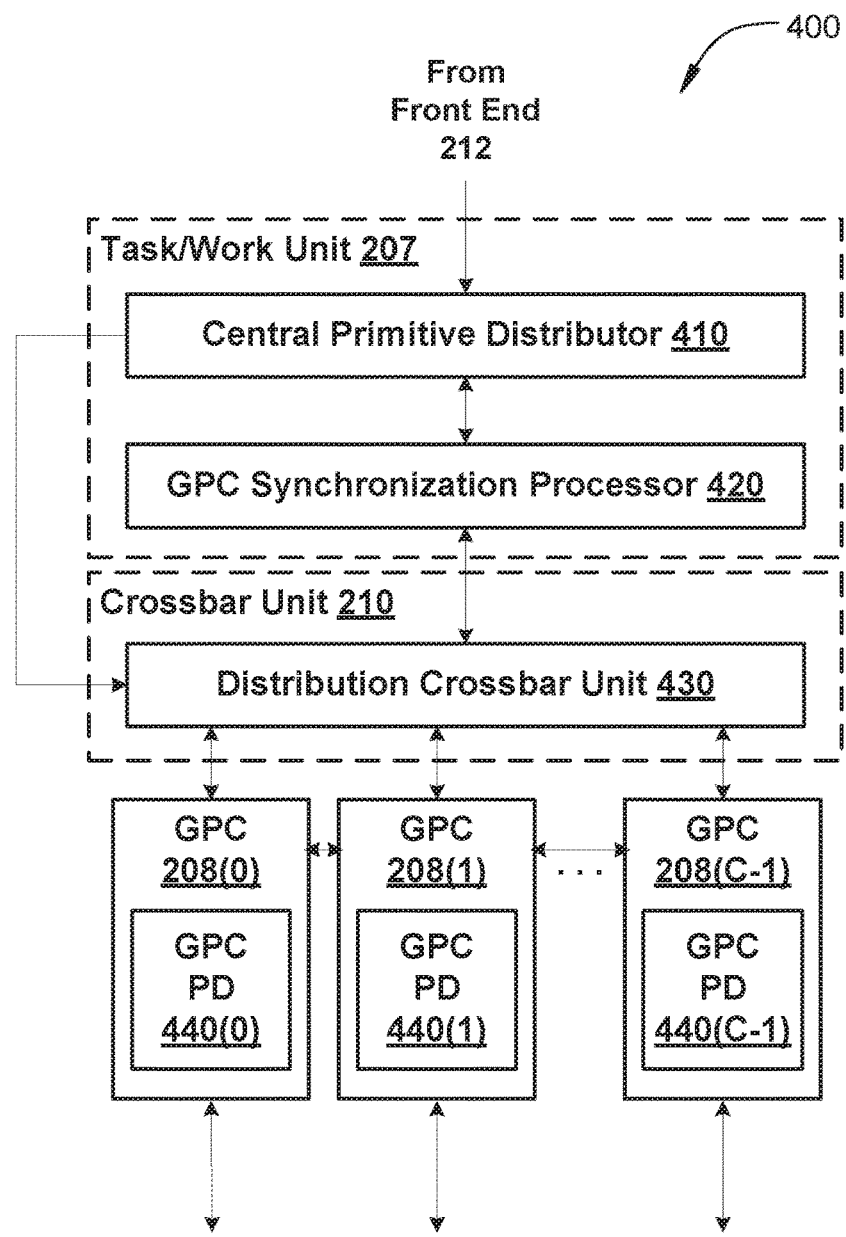
FIG. 4 is a detailed block diagram of a primitive distribution system implemented within the PPU of FIG. 2, according to various embodiments of the present invention.

FIG. 4 is a detailed block diagram of a primitive distribution system implemented within the PPU of FIG. 2, according to various embodiments of the present invention. As shown, the primitive distribution system 400 includes, without limitation, a central primitive distributor 410, a general processing cluster (GPC) synchronization processor 420, a distribution crossbar unit 430, and GPCs 208(0)-GPC (C−1). The central primitive distributor 410, and GPC synchronization processor 420 reside within the task/work unit 207 of FIG. 2. The distribution crossbar unit 430 resides within the crossbar unit 210 of FIG. 2. In some embodiments, the GPC synchronization processor 420 may reside within the crossbar unit 210 rather than the task/work unit 207, thereby placing the GPC synchronization processor 420 in closer proximity to the GPCs 208. In some embodiments, the primitive distribution system 400 may be implemented within the primitive distributor 355 of FIG. 3.

The central primitive distributor 410 is a global primitive distribution processor that receives draw commands from the front end 212, where each draw command includes instructions for drawing a graphics object. The central primitive distributor 410 performs the initial processing of the draw command. In general, the draw command includes the type of primitive (e.g. line segment, triangle strip, or triangle fan), the location of the first index in the index buffer, and the total number of indices to process. The central primitive distributor 410 divides the draw command into work slices that are more or less equal in size, where each work slice includes a subset of the total number of indices associated with the draw command.

In addition, each consecutive work slice includes a number of indices from the immediately prior work slice. This overlap is provided so that the downstream GPC primitive distributors can compare each vertex to the immediately prior indices without having to access indices from the previous work slice. Two consecutive work slices may overlap by any technically feasible number of indices. In some embodiments, the number of indices in the overlap may correspond to the type of graphics primitive represented by the work slice. If the work slice includes line segments, then consecutive work slices could overlap by one index. If the work slice includes triangle strips, then consecutive work slices could overlap by two indices.

In one example, each work slice could include 300 indices. Therefore, if the central primitive distributor 410 receives a draw command for triangle strips that includes 896 indices, then the central primitive distributor 410 would generate a first work slice that includes indices 0-299, a second work slice that includes indices 298-597, and a third work slice that includes indices 596-895. In essence, each of the three work slices may be considered as sub-draw commands, where each of the sub-draw commands processes one-third of the graphics primitives in the original draw command. Typically, the central primitive distributor 410 generates the work slices for each draw command without accessing the indices associated with the draw command.

The central primitive distributor 410 assigns each work slice to a GPC 208 via any technically feasible approach, including, without limitation, a round robin approach, a first available approach, or a priority-based approach. The central primitive distributor 410 transmits each work slice to the distribution crossbar unit 430. The central primitive distributor 410 also transmits a GPC identifier that identifies the assigned GPC to the GPC synchronization processor 420.

The GPC synchronization processor 420 is a global unit that receives GPC identifiers from the central primitive distributor 410. The GPC synchronization processor 420 logs each GPC identifier associated with each corresponding work slice, for all GPCs 208. The GPC synchronization processor 420 accesses this logged information when receiving feedback packets from the GPCs 208 and publishing the feedback packets to other GPCs 208, as further described herein. When the GPC synchronization processor 420 receives a feedback packet from a GPC 208 via the distribution crossbar unit 430, the GPC synchronization processor 420 accesses the logged GPC identifier information. Based on the logged GPC information, the GPC synchronization processor 420 determines which other GPCs 208 are processing work slices associated with the same draw command as the draw command associated with the received feedback packet. The GPC synchronization processor 420 then publishes the feedback packet via the distribution crossbar unit 430 to one or more of the other GPCs 208 that are processing work slices associated with the same draw command.

The distribution crossbar unit 430 receives work slices from the central primitive distributor 410. The distribution crossbar unit 430 routes each received work slice to the GPC 208 assigned to the work slice. The distribution crossbar unit 430 further receives feedback packets from the GPCs 208 and routes the feedback packets to the GPC synchronization processor 420. The distribution crossbar unit 430 further receives published feedback packets from the GPC synchronization processor 420 and routes the published feedback packets to the GPCs 208.

The GPCs 208(0)-208(C−1) receive work slices from the central primitive distributor 410 via the distribution crossbar unit 430. The GPCs 208(0)-208(C−1) each implement one or more graphics processing pipelines for processing the graphics primitives in the received work slices. Each of the GPCs 208(0)-208(C−1) includes a corresponding GPC primitive distributor 440(0)-440(C−1). Each GPC primitive distributor 440(0)-440(C−1) acts as a local primitive distributor for the corresponding GPC 208(0)-208(C−1). The GPC primitive distributor 440 fetches the indices specified by a received work slice from an index buffer that resides in memory. In general, the GPC primitive distributors 440 all fetch indices for the respective work slices in parallel with each other. As the GPC primitive distributor 440 fetches indices associated with a particular work slice, the GPC primitive distributor 440 performs an index scan of the fetched indices and records specific characteristics of interest needed by the associated GPC 208 and by the other GPCs 208 assigned to process consecutive work slices for the same draw command.

One such characteristic is the existence and location of the last restart index within the work slice. A restart index is a special index that does not point to a particular vertex, but, rather, identifies the end of one chain of graphics primitives and the beginning of another chain of primitives. The index immediately prior to the restart index is the last index for a particular chain of primitives, while the index immediately following the restart index is the first index for the next chain of primitives. For example, a restart index at index 500 could indicate that one triangle strip ends at index 499 and the next triangle strip begins at index 501. The existence and position of the last restart index in a particular work slice may affect how to properly interpret the indices at the beginning of one or more consecutive work slices.

Another such characteristic is a change in the type of graphics primitive within a work slice, such as a change from triangle strips to triangle fans, or vice versa. Yet another such characteristic is the winding order of the last graphics primitive of a work slice, where the winding order specifies whether the vertices of graphics primitive in a particular group, such as a triangle strip, are rendered in a clockwise or counterclockwise direction. The winding order of a graphics primitive determines the direction of the surface normal for the graphics primitive. Yet another such characteristic is the graphics primitive identifier of the last graphics primitive of a work slice, where each graphics primitive in a draw command is assigned a unique alphanumeric graphics primitive identifier to uniquely identify and distinguish each graphics primitive from all other graphics primitives. Yet another such characteristic is the instance identifier of the last graphics primitive of a work slice, where the instance identifier indicates a particular instance of an object that is being rendered multiple times. For example, if a particular graphics object or graphics primitive is to be rendered ten times, typically with different parameters such as 3D position, scale, and color, each of the ten renderings would be a different instance. Each of the ten instances would be assigned a unique instance identifier to uniquely identify and distinguish each instance from all other instances. Yet another such characteristic is the vertex identifier of the last vertex of a work slice, where each vertex in a draw command is assigned a unique alphanumeric vertex identifier to uniquely identify and distinguish each vertex from all other vertices. Additional such characteristics include an identifier of the anchor vertex for a triangle fan, and the starting index of the last multi-vector graphics primitive in the work slice.

If the number of work slices is less than or equal to the number of GPCs 208 available to process the draw command, then one work slice is assigned to each of the available GPC 208 until there are no additional work slices to assign. If the number of work slices is greater than the number of GPCs 208 available to process the draw command, then multiple work slices can be assigned one or more of the available GPCs 208. For example, if three GPCs 208 are available to process six work slices, then two work slices could be assigned to each of the three GPCs 208. If three GPCs 208 are available to process seven work slices, then two work slices could be assigned to each of two GPCs 208, and three work slices could be assigned to the third GPC 208. Each of the GPCs 208 can process the respectively assigned work slices in parallel with each other. If the GPC primitive distributor 440 is pipelined, then a GPC primitive distributor 440 can scan multiple assigned work slices in sequence up to the number of available pipelines.

After completing the index scan for a particular work slice, the GPC primitive distributor 440 generates a feedback packet that includes one or more of the above-described characteristics, such as the existence and location of a restart index, a change in graphics primitive type, an anchor point for a triangle fan, a winding order for a triangle strip, a graphics primitive identifier, an instance identifier, and a vertex identifier. The GPC primitive distributor 440 transmits the generated feedback packet to the GPC synchronization processor 420 which, in turn, publishes the feedback packet to one or more other GPCs 208 that are processing work slices for the same draw command. The GPC primitive distributor 440 then waits to receive any needed published feedback packets from these other GPCs 208 via the GPC synchronization processor 420. After receiving the needed published feedback packets from the GPC synchronization processor 420, the GPC primitive distributor 440 transfers the work slice and the published feedback packets to other elements (not explicitly shown in FIG. 4) within the GPC 208 to further process the graphics primitives within the work slice.

Figure 5:
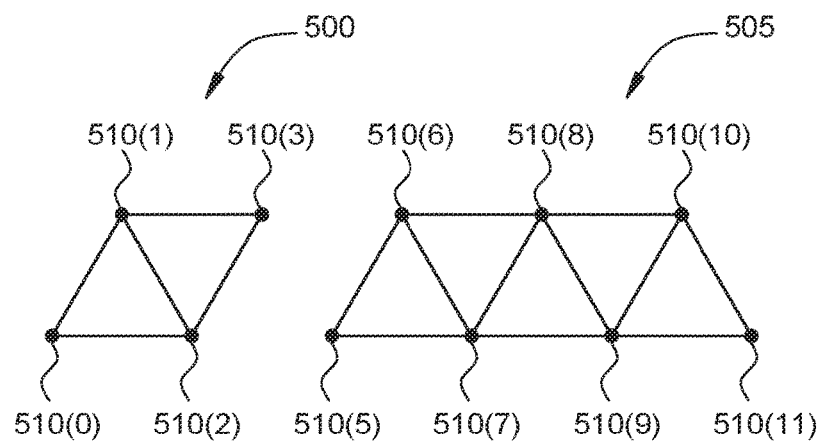
FIG. 5 illustrates how two triangle strips are distributed across two work slices, according to various embodiments of the present invention.

FIG. 5 illustrates how two triangle strips 500 and 505 are distributed across two work slices, according to various embodiments of the present invention. As shown, triangle strip 500 includes vertices 510(0)-510(3). Triangle strip 505 includes vertices 510(5)-510(11). The index list corresponding to the draw command for two triangle strips 500 and 505 appears below:

tri_strip {0, 1, 2, 3, 4(R), 5, 6, 7, 8, 9, 10, 11}

The left portion of the index list includes the indices {0, 1, 2, 3} corresponding to vertices 510(0), 510(1), 510(2), and 510(3) of triangle strip 500, respectively. The right portion of the index list includes the indices {5, 6, 7, 8, 9, 10, 11} corresponding to vertices 510(5), 510(6), 510(7), 510(8), 510(9), 510(10), and 510(11) of triangle strip 505, respectively. The index list also includes a restart index {4(R)} indicating the end of triangle strip 500 and the beginning of triangle strip 505.

Consider that the draw command for this triangle strip is split between two work slices WS0 and WS1 as follows:

WS0 {0, 1, 2, 3, 4(R), 5, 6, 7, 8}
WS1 {7, 8, 9, 10, 11}

Note that, because the draw command specifies triangle strips, the last two indices of WS0 overlap with the first to vertices of WS1. When processing WS0, and assuming a clockwise winding order, the assigned GPC renders the following triangles: {0, 1, 2}, {2, 1, 3}, {5, 6, 7}, and {7, 6, 8}. When processing WS1, and assuming a clockwise winding order, the assigned GPC renders the following triangles: {7, 8, 9}, {9, 8, 10}, and {9, 10, 11}. Note that, in this particular case, the triangles are rendered with a clockwise winding order even if the GPC assigned to process WS1 is unaware of the restart index {4(R)} in WS0.

Figure 6:
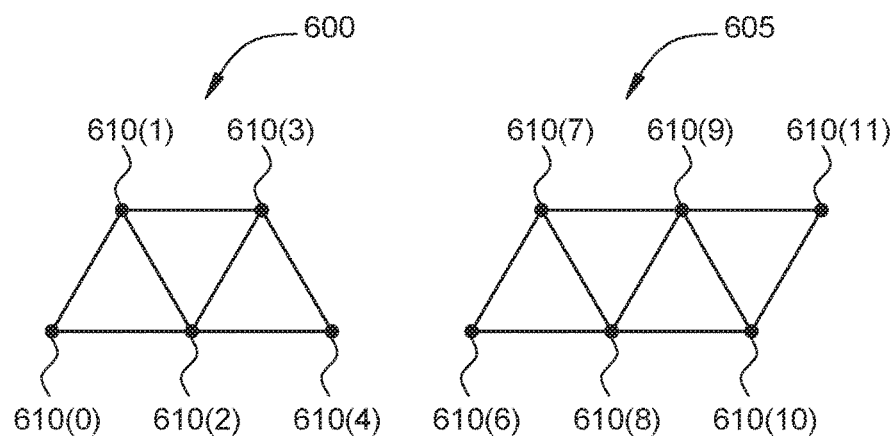
FIG. 6 illustrates how two triangle strips are distributed across two work slices, according to other various embodiments of the present invention.

FIG. 6 illustrates how two triangle strips 600 and 605 are distributed across two work slices, according to other various embodiments of the present invention. As shown, triangle strip 600 includes vertices 610(0)-610(4). Triangle strip 605 includes vertices 610(6)-610(11). The index list corresponding to the draw command for two triangle strips 600 and 605 appears below:

tri_strip {0, 1, 2, 3, 4, 5(R), 6, 7, 8, 9, 10, 11}

The left portion of the index list includes the indices {0, 1, 2, 3, 4} corresponding to vertices 610(0), 610(1), 610(2), 610(3) and 610(4) of triangle strip 600, respectively. The right portion of the index list includes the indices {6, 7, 8, 9, 10, 11} corresponding to vertices 610(6), 610(7), 610(8), 610(9), 610(10), and 610(11) of triangle strip 605, respectively. The index list also includes a restart index {5(R)} indicating the end of triangle strip 600 and the beginning of triangle strip 605.

Consider that the draw command for this triangle strip is split between two work slices WS0 and WS1 as follows:
  WS0 {0, 1, 2, 3, 4, 5(R), 6, 7, 8}
  WS1 {7, 8, 9, 10, 11}

Note that, because the draw command specifies triangle strips, the last two indices of WS0 overlap with the first to vertices of WS1. When processing WS0, and assuming a clockwise winding order, the assigned GPC renders the following triangles: {0, 1, 2}, {2, 1, 3}, {2, 3, 4}, and {6, 7, 8}. When processing WS1, if the assigned GPC is unaware of the restart index {5(R)} in WS0, then the assigned GPC would incorrectly render the following triangles: {7, 8, 9}, {9, 8, 10}, and {9, 10, 11}. If, on the other hand, the GPC assigned to WS1 is aware of the restart index {5(R)} in WS0, then the assigned GPC would correctly render the following triangles: {8, 7, 9}, {8, 9, 10}, and {10, 9, 11}. Note that, in this particular case, the triangles are correctly rendered with a clockwise winding order only if the GPC assigned to process WS0 informs the GPC assigned to process WS1 of the restart index {5(R)} in WS0.

Figure 7:
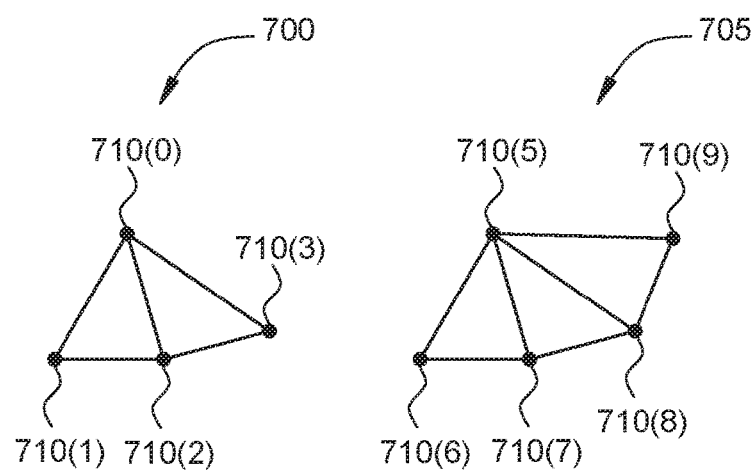
FIG. 7 illustrates how two triangle strips are distributed across two work slices, according to yet other various embodiments of the present invention.
Figure 9A:
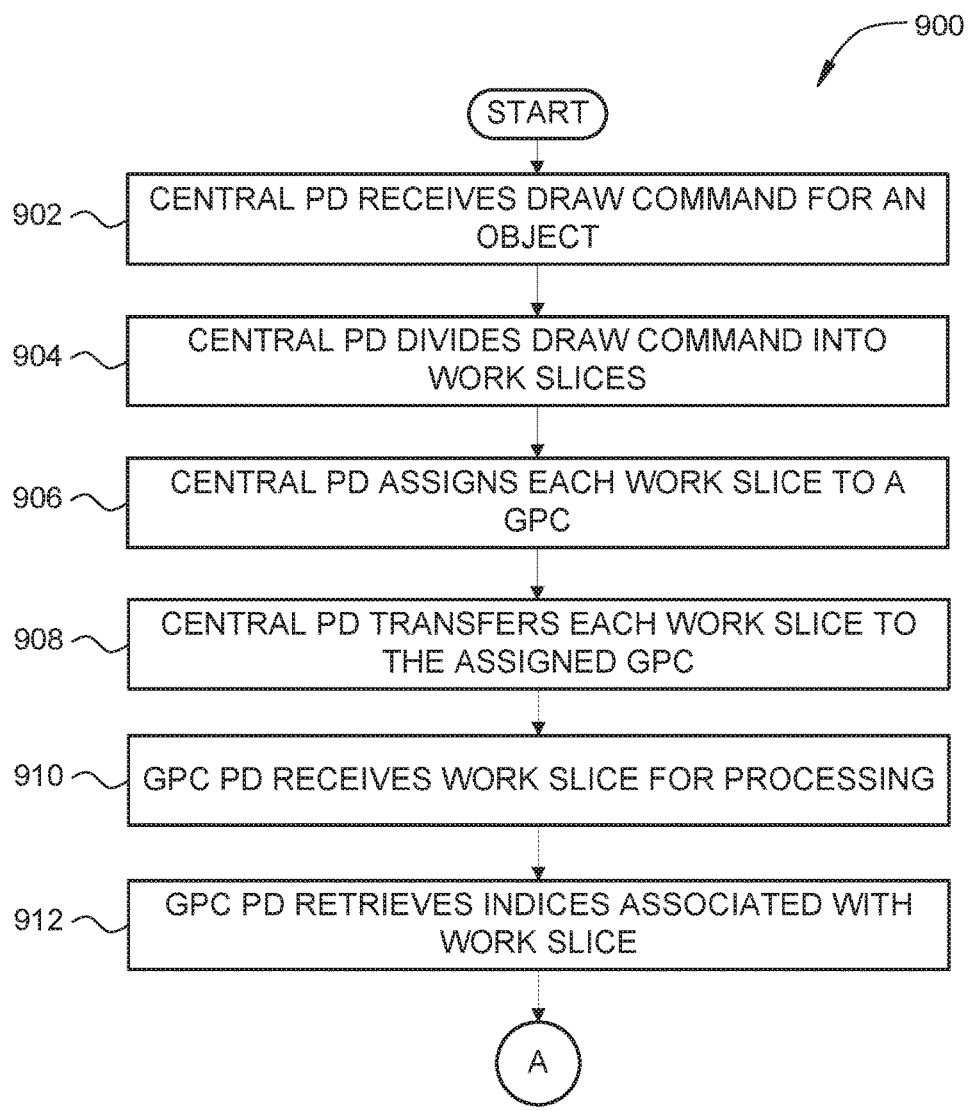
FIGS. 9A-9B set forth a flow diagram of method steps for distributing work slices associated with a graphics processing unit for processing, according to various embodiments of the present invention.
Figure 9B:
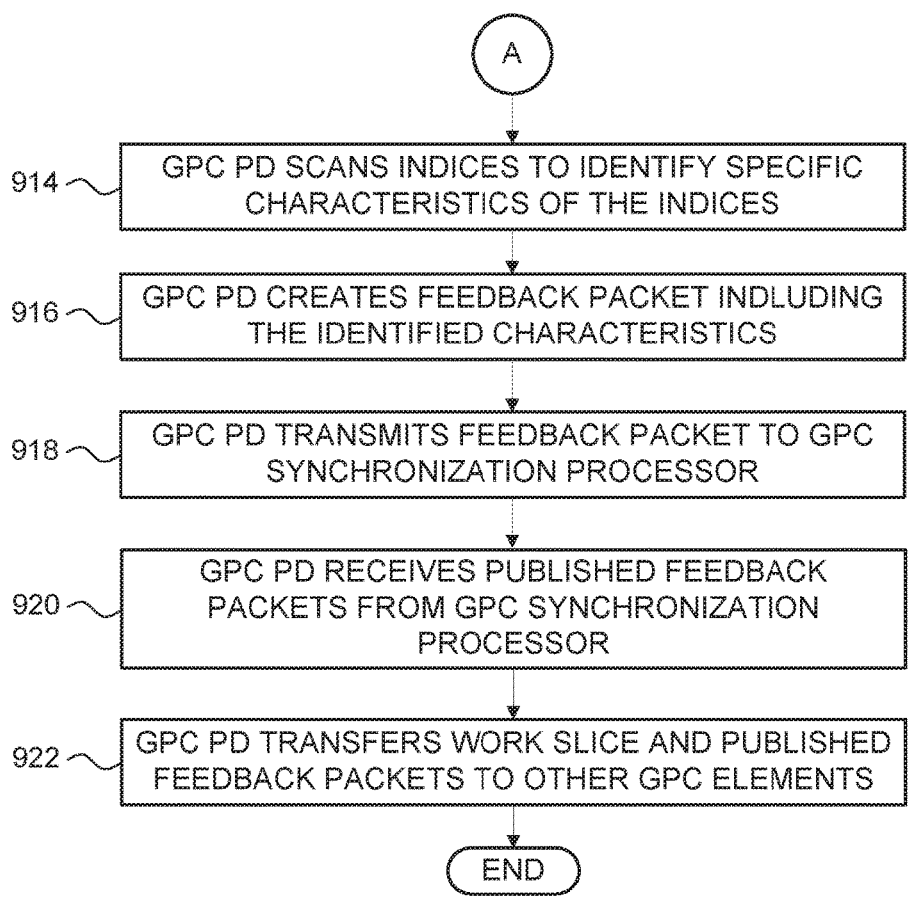

FIG. 7 illustrates how two triangle fans 700 and 705 are distributed across two work slices, according to yet other various embodiments of the present invention. As shown, triangle fan 700 includes vertices 710(0)-710(3). Triangle strip 705 includes vertices 710(5)-710(11). The index list corresponding to the draw command for two triangle strips 700 and 705 appears below:
  tri_fan {0, 1, 2, 3, 4(R), 5, 6, 7, 8, 9, 10, 11}

The left portion of the index list includes the indices {0, 1, 2, 3} corresponding to vertices 710(0), 710(1), 710(2), and 710(3) of triangle fan 700, respectively. The right portion of the index list includes the indices {5, 6, 7, 8, 9, 10, 11} corresponding to vertices 710(5), 710(6), 710(7), 710 (8), 710(9), 710(10), and 710(11) of triangle fan 705, respectively. The index list also includes a restart index {4(R)} indicating the end of triangle fan 700 and the beginning of triangle fan 705.

Consider that the draw command for this triangle fan is split between two work slices WS0 and WS1 as follows:
  WS0 {0, 1, 2, 3, 4(R), 5}
  WS1 {0, 6, 7, 8, 9}

When processing WS0, the assigned GPC renders the following triangles: {0, 1, 2} and {0, 2, 3}. When processing WS1, if the assigned GPC is unaware of the restart index {4(R)} and the new anchor point {5} in WS0, then the assigned GPC would incorrectly render the following triangles: {0, 6, 7} and {0, 7, 8}, and {0, 8, 9}, because the GPC assumes the anchor point is still index {0}. If, on the other hand, the GPC assigned to WS1 is aware of the restart index {4(R)} and the new anchor point {5} in WS0, then the assigned GPC would correctly render the following triangles: {5, 6, 7}, {5, 7, 8}, and {5, 8, 9}. Note that, in this particular case, the triangles are correctly rendered with a correct anchor points only if the GPC assigned to process WS0 informs the GPC assigned to process WS1 of the restart index {4(R)} and new anchor point {5} in WS0.

As these examples show, by forwarding feedback packets to the GPC synchronization processor 420 and utilizing the information in the published feedback packets received from the GPC synchronization processor 420, the GPC primitive distributors 440 can properly prepare work slices for correct rendering by the respective GPCs 208.

Figure 8:
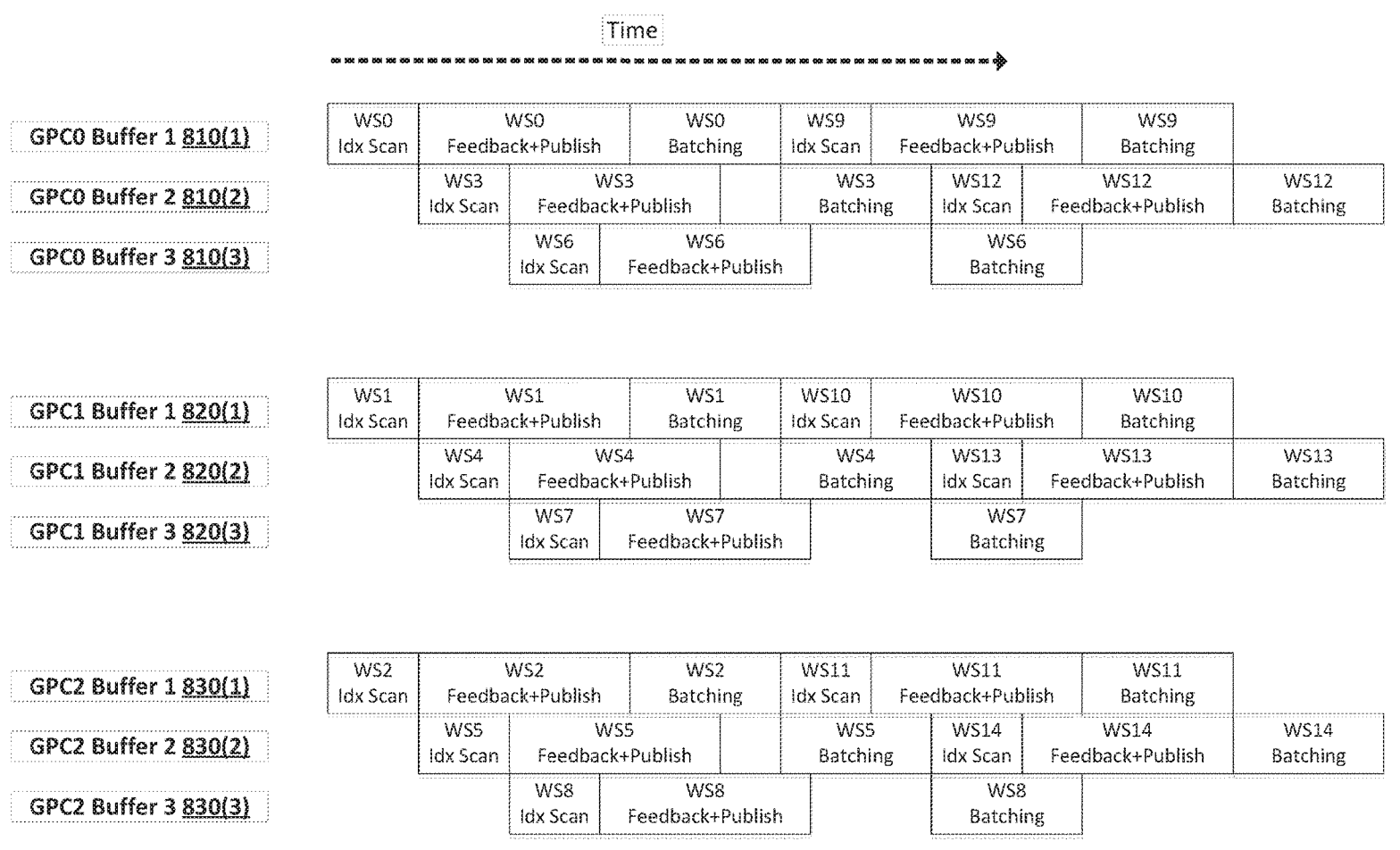

FIG. 8 illustrates a timeline of work slice processing across three of the GPCs of FIG. 4, according to various embodiments of the present invention. As shown, the timeline includes separate timelines for GPC0, GPC1, and GPC2. In order to hide the latency for performing index scanning, transmitting feedback packets, and receiving published feedback packets, the fetch memory for the GPC primitive distributors 440 may be multi-buffered. As shown in FIG. 8, the fetch memory for the GPC primitive distributors 440 is triple-buffered. The timeline for GPC0 includes individual timelines for GPC0 buffer 1 810(1), GPC0 buffer 2 810(2), and GPC0 buffer 3 810(3). Similarly, the timeline for GPC1 includes individual timelines for GPC1 buffer 1 820(1), GPC1 buffer 2 820(2), and GPC1 buffer 3 820(3). The timeline for GPC2 includes individual timelines for GPC2 buffer 1 830(1), GPC2 buffer 2 830(2), and GPC2 buffer 3 830(3).

As shown, a draw command generates 15 work slices, identified as WS0-WS14. Work slices are assigned to GPC0-GPC2 in a round robin approach. Therefore, GPC0 receives work slices WS0, WS3, WS6, WS9, and WS12. GPC1 receives work slices WS1, WS4, WS7, WS10, and WS13. GPC2 receives work slices WS2, WS5, WS8, WS11, and WS14. Each GPC then processes the respective work slices. Initially, GPC0 buffer 1 810(1) performs an index scan for WS0, GPC1 buffer 1 820(1) performs an index scan for WS1, and GPC2 buffer 1 830(1) performs an index scan for WS2 in parallel. At the conclusion of the index scans for WS0-WS2, GPC0 buffer 1 810(1), GPC1 buffer 1 820(1), and GPC2 buffer 1 830(1) send feedback packets to the GPM synchronization processor 420 and wait for published feedback packets from the GPM synchronization processor 420 for WS0, WS1, and WS2, respectively. In parallel, GPC0 buffer 2 810(2), GPC1 buffer 2 820(2), and GPC2 buffer 2 830(2) perform an index scan for WS3, WS4, and WS5, respectively.

At the conclusion of the index scans for WS3-WS5, GPC0 buffer 2 810(2), GPC1 buffer 2 820(2), and GPC2 buffer 2 830(2) send feedback packets to the GPM synchronization processor 420 and wait for published feedback packets from the GPM synchronization processor 420 for WS3, WS4, and WS5, respectively. In parallel, GPC0 buffer 3 810(3), GPC1 buffer 3 820(3), and GPC2 buffer 3 830(3) perform an index scan for WS6, WS7, and WS8, respectively.

At the conclusion of the feedback+publish phase for WS0-WS2, GPC0 buffer 1 810(1), GPC1 buffer 1 820(1), and GPC2 buffer 1 830(1) submit work slices WS0, WS1, and WS2 to the respective GPCs for batching and rendering. At the conclusion of the feedback+publish phase for WS3-WS5, GPC0 buffer 2 810(2), GPC1 buffer 2 820(2), and GPC2 buffer 2 830(2) wait for the respective GPCs to be ready for another batch. When the GPCs are ready, GPC0 buffer 2 810(2), GPC1 buffer 2 820(2), and GPC2 buffer 2 830(2) submit work slices WS3, WS4, and WS5 to the respective GPCs for batching and rendering.

At the conclusion of the feedback+publish phase for WS6-WS8, GPC0 buffer 3 810(3), GPC1 buffer 3 820(3), and GPC2 buffer 3 830(3) wait for the respective GPCs to be ready for another batch. When the GPCs are ready, GPC0 buffer 3 810(3), GPC1 buffer 3 820(3), and GPC2 buffer 3 830(3) submit work slices WS6, WS7, and WS8 to the respective GPCs for batching and rendering. The technique continues for each work slice until all work slices are processed. In this manner, the overhead for processing work slice indices with the GPC primitive distributors 440 is, in large part, performed in parallel with batching and rendering of the graphics primitives within the work slice.

9A-9B set forth a flow diagram of method steps for distributing work slices associated with a graphics processing unit for processing, according to various embodiments of the present invention. Although the method steps are described in conjunction with the systems of FIGS. 1-4, persons skilled in the art will understand that any system configured to perform the method steps, in any order, is within the scope of the present disclosure.

As shown, a method 900 begins at step 902, where a central primitive distributor 410 receives a draw command for a graphics object. At step 904, the central primitive distributor 410 divides the draw command into a plurality of work slices, where each work slice is associated with a subset of the indices associated with the draw command. At step 906, the central primitive distributor 410 assigns each work slice to a GPC 208 that includes one or more graphics processing pipelines. The central primitive distributor 410 assigns the work slices to GPCs 208 via any technically feasible approach, including, without limitation, a round robin approach, a first available approach, or a priority-based approach. If the number of work slices is less than or equal to the number of GPCs 208 available to process the draw command, then one work slice is assigned to each of the available GPC 208 until there are no additional work slices to assign. If the number of work slices is greater than the number of GPCs 208 available to process the draw command, then multiple work slices can be assigned one or more of the available GPCs 208. For example, if three GPCs 208 are available to process six work slices, then two work slices could be assigned to each of the three GPCs 208. If three GPCs 208 are available to process seven work slices, then two work slices could be assigned to each of two GPCs 208, and three work slices could be assigned to the third GPC 208. Each of the GPCs 208 can process the respectively assigned work slices in parallel with each other.

At step 908, the central primitive distributor 410 transfers each work slice to the GPC 208 assigned to that work slice. At step 910, a GPC primitive distributor 440 associated with a given GPC 208 receives a work slice for processing. At step 912, the GPC primitive distributor 440 retrieves the indices associated with the work slice.

At step 914, the GPC primitive distributor 440 scans the retrieved indices to identify certain characteristics needed for processing other related work slices associated with the draw command. The characteristics include, without limitation, the existence and position of a restart index, a winding order associated with a triangle strip an anchoring vertex associated with a triangle fan, a graphics primitive identifier, an instance identifier and a vertex identifier. If more than one GPC primitive distributor 440 has been assigned a work slice to scan, then each GPC primitive distributor 440 with an assigned work slice can scan the respective work slice in parallel with other GPC primitive distributors 440. If the GPC primitive distributor 440 is pipelined, then a GPC primitive distributor 440 can scan multiple assigned work slices in sequence up to the number of available pipelines. At step 916, the GPC primitive distributor 440 creates a feedback packet that includes one or more of the identified characteristics. At step 918, the GPC primitive distributor transmits 440 the feedback packet to a GPC synchronization processor 420 via a distribution crossbar unit 430. At step 920, the GPC primitive distributor 440 receives one or more published feedback packets from the GPC synchronization processor 420 via a distribution crossbar unit 430. The published feedback packets include one or more identified characteristics from other work slices associated with the draw command. At step 922, the GPC primitive distributor 440 transfers the work slice and the published feedback packets to other elements in the GPC 208 for further processing. Such further processing includes, without limitation, primitive assembly, batch generation, vertex shading, tessellation, and geometry shading, rasterization, and pixel shading. As other elements in the GPC 208 perform further processing on a given work slice, the GPC primitive distributor 440 can scan one or more additional work slices in parallel with the further processing on the given work slice. The method 900 then terminates.

In sum, a central primitive distributor divides indices related to incoming draw commands into work slices and distributes the work slices to the different graphics processing pipelines implemented within the GPU without first analyzing the indices to eliminate duplicate indices. Individual primitive distributors associated with each graphics processing pipeline fetch the indices and performs a scan of the indices within a work slice assigned to the respective graphics processing primitive. The individual primitive distributors transmit feedback packets to a central synchronization processor, where the feedback packets include information about a work slice that may be needed by other primitive distributors, such as a location of the last restart index in a work slice, and the current winding order of the last graphics primitive in a work slice. The central synchronization processor publishes the received feedback packets to all other primitive distributors. Each of the individual primitive distributors then appends the published information to the work slice and forwards the work slice, including the appended published information, to the respective graphics processing pipeline for further processing.

At least one advantage of the disclosed technique is that, because multiple work slices are analyzed in parallel for duplicate indices, the time required to analyze work slices is more in balance with the time required to process the work slices, leading to greater utilization of GPU resources and improved overall performance. Moreover, the quantity of primitive distributors analyzing indices scales linearly with the quantity of graphics processing pipelines processing the indices, resulting in improved performance irrespective of the number of work slices being processed in parallel. Another advantage of the disclosed approach is that each GPC can work at lower primitive rate, and hence the memory bandwidth requirement for each GPC is lower relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for distributing work slices associated with a graphics processing unit for processing, the method comprising:
   receiving a draw command related to a graphics object that is associated with a plurality of indices;
   dividing the draw command into a plurality of work slices, wherein each work slice is associated with a different subset of the indices included in the plurality of indices;
   scanning a first subset of indices associated with a first work slice included in the plurality of work slices to identify a first set of graphics processing characteristics that affect graphics processing of a second work slice included in the plurality of work slices and associated with a second subset of indices; and
   after scanning the first subset of indices:
      performing one or more graphics processing operations on the first work slice associated with the first subset of indices; and
      performing one or more graphics processing operations on the second work slice associated with the second subset of indices, at least partially in parallel with the one or more graphics processing operations on the first work slice, based at least in part on the first set of graphics processing characteristics.

2. The method of claim 1, wherein the first set of graphics processing characteristics includes a position of a restart index that identifies an end of a first set of graphics primitives associated with a first index included in the first subset of indices and a beginning of a second set of graphics primitives associated with a second index included in the first subset of indices.

3. The method of claim 1, wherein the first set of graphics processing characteristics includes a winding order of a triangle strip associated with a first index included in the first subset of indices.

4. The method of claim 1, wherein the first set of graphics processing characteristics includes an anchor point of a triangle fan associated with a first index included in the first subset of indices.

5. The method of claim 1, further comprising:
   scanning a third subset of indices associated with a third work slice included in the plurality of work slices to identify a second set of graphics processing characteristics that is needed to process a fourth subset of indices;
   wherein one or more operations related to scanning the third subset of indices are performed in parallel with one or more operations related to processing the second work slice associated with the second subset of indices.

6. The method of claim 1, further comprising:
   creating a first feedback packet indicating the first set of graphics processing characteristics; and
   causing the first feedback packet to be transmitted to one or more processors assigned to process the second work slice included in the plurality of work slices.

7. The method of claim 6, further comprising receiving a second feedback packet from a synchronization processor, wherein the second feedback packet is based on a second set of characteristics associated with a third work slice, and the second set of characteristics is needed to process the first subset of indices.

8. The method of claim 7, further comprising changing a winding order of a triangle strip associated with the first work slice based on the second feedback packet.

9. A primitive distribution system, comprising:
   a central primitive distributor configured to divide a draw command into a plurality of work slices for drawing a graphics object, wherein each work slice is associated with a different subset of the indices included in a plurality of indices associated with the draw command; and a first local primitive distributor configured to:
receive, from the central primitive distributor, a first work slice included in the plurality of work slices that is associated with a first subset of indices,
scan the first subset of indices to identify a first set of graphics processing characteristics that affect graphics processing of a second work slice included in the plurality of work slices and associated with a second subset of indices, and
after scanning the first subset of indices:
cause one or more graphics processing operations to be performed on the first work slice associated with the first subset of indices; and
cause one or more graphics processing operations to be performed on the second work slice associated with the second subset of indices, at least partially in parallel with the one or more graphics processing operations on the first work slice, based at least in part on the first set of graphics processing characteristics.

10. The primitive distribution system of claim 9, wherein the first set of graphics processing characteristics includes a graphics primitive identifier that identifies a graphics primitive included in the first work slice.

11. The primitive distribution system of claim 9, wherein the first set of graphics processing characteristics includes an instance identifier that identifies an instance of a graphics primitive included in the first work slice.

12. The primitive distribution system of claim 9, wherein the first set of graphics processing characteristics includes a vertex identifier that identifies a vertex included in the first work slice.

13. The primitive distribution system of claim 9, further comprising:
a second local primitive distributor configured to:
receive the second work slice from the central primitive distributor;
scan the second subset of indices to identify a second set of graphics processing characteristics that is needed to process a third subset of indices; and
process the second work slice associated with the second subset of indices based at least in part on the first set of graphics processing characteristics;
wherein one or more operations related to scanning the second subset of indices are performed in parallel with one or more operations related to scanning the first subset of indices.

14. The primitive distribution system of claim 9, further comprising a synchronization processor wherein the first local primitive distributor is further configured to:
create a first feedback packet indicating the first set of graphics processing characteristics; and
transmit the first feedback packet to the synchronization processor,
wherein the synchronization processor is configured to forward the first feedback packet to one or more processors assigned to process the second work slice.

15. The primitive distribution system of claim 14, wherein the one or more processors assigned to process the second work slice are further configured to receive the first feedback packet from the synchronization processor.

16. The primitive distribution system of claim 15, further comprising changing a winding order of a triangle strip associated with the second work slice based on the first feedback packet.

17. The primitive distribution system of claim 15, further comprising changing an anchor point of a triangle fan associated with the second work slice based on the first feedback packet.

18. A graphics processing unit, comprising:
a central primitive distributor configured to divide a draw command into a plurality of work slices for drawing a graphics object, wherein each work slice is associated with a different subset of the indices included in a plurality of indices associated with the draw command;
a first local primitive distributor configured to:
receive, from the central primitive distributor, a first work slice included in the plurality of work slices that is associated with a first subset of indices, and
scan the first subset of indices to identify a first set of graphics processing characteristics that affect graphics processing of a second work slice included in the plurality of work slices and associated with a second subset of indices;
a first graphics processing pipeline configured to, after the first local primitive distributor scans the first subset of indices, perform one or more graphics processing operations on the first work slice associated with the first subset of indices; and
a second graphics processing pipeline configured to, after the first local primitive distributor scans the first subset of indices, perform one or more graphics processing operations on the second work slice associated with the second subset of indices, at least partially in parallel with the one or more graphics processing operations on the first work slice, based at least in part on the first set of graphics processing characteristics.

19. The graphics processing unit of claim 18, wherein the first set of graphics processing characteristics includes a position of a restart index that identifies an end of a first set of graphics primitives associated with a first index included in the first subset of indices and a beginning of a second set of graphics primitives associated with a second index included in the first subset of indices.

20. The graphics processing unit of claim 18, wherein the first set of graphics processing characteristics includes a winding order of a triangle strip associated with a first index included in the first subset of indices.

* * * * *